US011930213B2

(12) United States Patent
Vandame et al.

(10) Patent No.: US 11,930,213 B2
(45) Date of Patent: Mar. 12, 2024

(54) METHOD FOR ENCODING A MATRIX OF IMAGE VIEWS OBTAINED FROM DATA ACQUIRED BY A PLENOPTIC CAMERA

(71) Applicant: INTERDIGITAL VC HOLDINGS, INC., Wilmington, DE (US)

(72) Inventors: Benoit Vandame, Betton (FR); Fabien Racape, San Francisco, CA (US); Guillaume Boisson, Pleumeleuc (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/625,812

(22) PCT Filed: Jun. 26, 2018

(86) PCT No.: PCT/EP2018/067155
§ 371 (c)(1),
(2) Date: Dec. 23, 2019

(87) PCT Pub. No.: WO2019/002317
PCT Pub. Date: Jan. 3, 2019

(65) Prior Publication Data
US 2021/0160540 A1    May 27, 2021

(30) Foreign Application Priority Data

Jun. 30, 2017 (EP) .................................. 17305832

(51) Int. Cl.
*H04N 19/597* (2014.01)
*H04N 19/105* (2014.01)
(Continued)

(52) U.S. Cl.
CPC ......... *H04N 19/597* (2014.11); *H04N 19/105* (2014.11); *H04N 19/176* (2014.11); *H04N 19/593* (2014.11)

(58) Field of Classification Search
CPC .. H04N 19/597; H04N 19/105; H04N 19/176; H04N 19/593
See application file for complete search history.

(56) References Cited

U.S. PATENT DOCUMENTS 8,373,933 B2    2/2013 Eguchi
2011/0243224 A1    10/2011 Su et al.
(Continued)

FOREIGN PATENT DOCUMENTS

CN    101588437 A    11/2009
EP    2114072 A1    11/2009
(Continued)

OTHER PUBLICATIONS

Wanner et as, "Generating EPI Representation of a 4D Light Fields with a Single Lens Focused Plenoptic Camera", Heidelberg Collaboratory for image Processing (HCI), G. Bebis et al. (Eds.): ISVC 2011, Part I, LNCS 6938, pp. 90-101, 2011, Springer-Verlag Berlin Heidelberg 2011.
(Continued)

Primary Examiner — Md N Haque
(74) Attorney, Agent, or Firm — CONDO ROCCIA KOPTIW LLP

(57) ABSTRACT

In one embodiment of the disclosure, it is proposed a method for encoding a matrix of image views obtained from data acquired by a plenoptic camera. The method is remarkable in that it comprises: obtaining at least one reference image view from a combination of at least two image views from said matrix of image views; encoding image views that are different from said at least one reference image view, based on said at least one reference image view.

18 Claims, 19 Drawing Sheets

(51) Int. Cl.
*H04N 19/176* (2014.01)
*H04N 19/593* (2014.01)

(56) References Cited

U.S. PATENT DOCUMENTS

| | | | |
|---|---|---|---|
| 2012/0176381 A1* | 7/2012 | Park | G06T 17/005 |
| | | | 345/424 |
| 2013/0259130 A1 | 10/2013 | Coban et al. | |
| 2013/0329806 A1 | 12/2013 | Tu et al. | |
| 2015/0319456 A1* | 11/2015 | Le Floch | H04N 19/119 |
| | | | 375/240.12 |
| 2016/0241855 A1* | 8/2016 | Le Floch | H04N 19/103 |
| 2018/0278955 A1* | 9/2018 | Thoreau | G06T 5/20 |
| 2018/0316935 A1* | 11/2018 | Boisson | H04N 19/577 |
| 2019/0158877 A1* | 5/2019 | Thoreau | H04N 19/15 |

FOREIGN PATENT DOCUMENTS

| | | |
|---|---|---|
| EP | 2879372 A1 | 6/2015 |
| EP | 2984841 A1 | 2/2016 |
| EP | 3142365 A1 | 3/2017 |
| GB | 2488905 B | 12/2011 |
| WO | WO-03020167 A2 * | 3/2003 ........... A61B 3/1015 |
| WO | WO 2013086180 A1 | 6/2013 |
| WO | WO 2013180192 A1 | 12/2013 |
| WO | WO 2017068022 | 4/2017 |

OTHER PUBLICATIONS

Magnor, et al., "Data Compression for Light-Field Rendering", IEEE Transactions Circuits and Systems for Video Technology, vol. 10, No. 3, Apr. 2000, pp. 338-343.

Jiang, et al., "Light Field Compression with Homography-based Low Rank Approximation", .pp. 1-13.

Magnor, Marcus, et al., "Data Compression for Light-fiel Rendering", IEEE Transactions on Circuits and Systems for Video Technology, vol. 10, No. 3, Apr. 2000, 338-343 pages.

Sun et al., Light Field Compression Based on HEVC Encoding and Decoding Electronic Design Engineering, No. 4, Feb. 20, 2017, 5 pages.

Sun et al., Light Field Compression Based on HEVC Encoding and Decoding Electronic Design Engineering, No. 4, Feb. 20, 2017, 5 pages, Cited in Office Action issued in related Chinese Patent Application No. 201880053549.3 dated Feb. 4, 2023.

* cited by examiner

FIG. 16

$f = 25.00$  Fno $= 1.46$  $2\omega = 81.8°$

| Surface number | r | d | nd | vd | Effective diameter | |
|---|---|---|---|---|---|---|
| 1 | 106.476 | 2.80 | 1.69680 | 55.5 | 52.62 | |
| 2 | 34.237 | 7.20 | | | 43.99 | |
| 3 | 231.200 | 2.30 | 1.69680 | 55.5 | 43.78 | |
| 4 | 36.544 | 5.48 | | | 39.80 | |
| 5 | 152.788 | 5.38 | 1.79952 | 42.2 | 39.73 | |
| 6 | −73.268 | 2.87 | | | 39.50 | |
| 7 | 52.697 | 3.50 | 1.84666 | 23.8 | 32.57 | |
| 8 | 125.863 | 1.70 | 1.43875 | 95.0 | 31.14 | |
| 9 | 25.660 | 7.10 | | | 26.95 | |
| 10 | ∞ | 7.48 | | | 24.90 | |
| 11 | 55.654 | 7.30 | 1.80400 | 46.6 | 28.32 | |
| 12 | −44.368 | 2.00 | | | 28.20 | |
| 13 | −160.594 | 1.48 | 1.75520 | 27.5 | 25.63 | OgF = 0.635 |
| 14 | 83.004 | 3.13 | | | 24.75 | |
| 15 | ∞ | 8.68 | | | 24.10 | Stop |
| 16 | −17.472 | 1.50 | 1.84666 | 23.8 | 22.79 | |
| 17 | 42.214 | 6.75 | 1.60300 | 65.4 | 27.56 | |
| 18* | −26.911 | 0.15 | | | 28.33 | |
| 19* | −160.623 | 6.00 | 1.43875 | 95.0 | 30.48 | |
| 20 | −24.626 | 0.15 | | | 31.32 | |
| 21 | −273.831 | 7.25 | 1.73000 | 26.0 | 36.05 | |
| 22 | −30.409 | | | | 37.09 | |

Aspherical data

Eighteenth surface

K = 0.00000e+000   A = 0   B = 1.29928e−005   C = 9.54236e−009
D = −1.36553e−010   E = 3.48384e−013

Nineteenth surface

K = 0.00000e+000   A = 0   B = 3.56049e−007   C = −3.33936e−008
D = 7.24902e−011   E = −3.40933e−014

| | Reference | | | | Tested | | | | BD-rate (piecewise cubic) | | |
|---|---|---|---|---|---|---|---|---|---|---|---|
| QPISlice | kbps | 00 psnr | 01 psnr | 11 psnr | 10 psnr | kbps | 00 psnr | 01 psnr | 11 psnr | 10 psnr | 00' | 01' | 11' | 10' |
| 22 | 17329.80 | 42.68 | 40.10 | 40.14 | 40.07 | 12471.93 | 39.92 | 39.94 | 39.89 | 39.93 | 47.54% | -30.33% | -23.78% | -32.48% |
| 27 | 4414.90 | 39.08 | 37.79 | 37.79 | 37.71 | 2742.50 | 37.78 | 37.80 | 37.70 | 37.78 | | | | |
| 32 | 1502.65 | 37.48 | 36.68 | 36.79 | 36.61 | 1270.58 | 36.77 | 36.80 | 36.69 | 36.76 | | | | |
| 37 | 736.44 | 36.19 | 35.31 | 35.52 | 35.25 | 645.62 | 35.49 | 35.55 | 35.41 | 35.49 | | | | |
| QPISlice | kbps | average | | | | kbps | average | | | | average | | | |
| 22 | 17329.80 | 40.75 | | | | 12471.93 | 39.92 | | | | -12.54% | | | |
| 27 | 4414.90 | 38.09 | | | | 2742.50 | 37.76 | | | | | | | |
| 32 | 1502.65 | 36.89 | | | | 1270.58 | 36.75 | | | | | | | |
| 37 | 736.44 | 35.57 | | | | 645.62 | 35.49 | | | | | | | |

METHOD FOR ENCODING A MATRIX OF IMAGE VIEWS OBTAINED FROM DATA ACQUIRED BY A PLENOPTIC CAMERA

CROSS-REFERENCE TO RELATED APPLICATIONS

This application is the national stage entry claims the benefit, under 35 U.S.C. § 371 of International Application PCT/EP2018/067155, filed Jun. 26, 2018, which was published in accordance with PCT Article 21(2) on Jan. 3, 2019, in English, and which claims the benefit of European Patent Application No. 17305832.2, filed Jun. 30, 2017, the disclosures of each of which are incorporated by reference herein in their entireties.

TECHNICAL FIELD

The disclosure relates to the encoding and decoding of 4D raw light field data being acquired by a plenoptic camera.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Plenoptic cameras comprises in addition to features of conventional cameras a micro-lens array set positioned just in front of the sensor as illustrated in FIG. 1, or in documents WO 2013/180192 and GB 2488905. In such architecture, each micro-lens projects on a sensor a micro-lens image. Hence, a plenoptic camera can record a set of micro-lens images (usually called a 4D raw light field data or also a plenoptic image) which can be processed in order to perform for example re-focusing of images. It should be noted that such 4D raw light field data can be converted into other format/representation (for example via a format corresponding to a set of sub-aperture images (where a sub-aperture image corresponds to a captured image of a scene from a point of view, the point of view being slightly different between two sub-aperture images; these sub-aperture images give information about the parallax and depth of the imaged scene), or via a format corresponding to a set of epipolar images (see for example the article entitled: "*Generating EPI Representation of a 4D Light Fields with a Single Lens Focused Plenoptic Camera*", by S. Wanner and al., published in the conference proceedings of ISVC 2011)).

Therefore, obtaining an efficient encoding technique for encoding data being a set of sub-aperture images (also named a matrix of sub-aperture images) is a hectic research issue due to the fact it can reduce the storage (or transmission) of such encoded data.

A solution for encoding data being a set of sub-aperture images consists in using the technique described in the article entitled "*Light Field Compression with Homography-based Low Rank Approximation*" by Xiaoran Jiang et al. that proposes to align the different sub-aperture images by using one or multiple homographies in order to obtain a light field low rank representation, and then encode such light field low rank representation using classical HEVC encoding technique.

Another solution for encoding data being a set of sub-aperture images consists in using classical encoding techniques such as HEVC ("High Efficiency Video Coding") or MV-HEVC ("Multi-view High Efficiency Video Coding") as mentioned in document US 2015/0319456 where a reference image is selected in the set of sub-aperture images. In addition, in document US 2015/0319456, the encoding of the sub-aperture images can be done according to compression parameters (e.g. motion search windows, maximum coding unit size, etc.) and camera parameters (focal length, main lens aperture, etc.). Hence, in some cases, each sub-aperture image can be encoded independently from the others sub-aperture images by using intra-encoding techniques as proposed by the HEVC encoding scheme. In a variant, one or more reference images are selected among the set of sub-aperture images (see for example paragraph [0086] of document US 2015/0319456) for performing the encoding based on spatial predictions. The document US 2016/0241855 details the encoding of a sequence of plenoptic images that can be viewed as a sequence of matrixes of sub-aperture images.

However, neither document US 2015/0319456, nor document US 2016/0241855 does tackle the issue of how one or several reference images have to be chosen among the set of sub-aperture images. Indeed, only classical techniques from multi-view encoding techniques are used.

The proposed technique provides an efficient way of selecting one or several reference images in a set of sub-aperture images derived from a plenoptic image, for compression purpose.

SUMMARY OF THE DISCLOSURE

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present disclosure is directed to a method for encoding a matrix of image views obtained from data acquired by a plenoptic camera. The method is remarkable in that it comprises:
  obtaining at least one reference image view from a combination of at least two image views from said matrix of image views;
  encoding image views that are different from said at least one reference image view, based on said at least one reference image view.

It should be noted that due to the fact that the matrix of image views (also named a matrix of sub-aperture images) is obtained from a plenoptic camera, the sub-aperture images have some light flux variation between themselves. Indeed, such light flux variation between the sub-aperture images that can be an issue for video encoding. The light flux variation is induced by the design of a plenoptic camera. Indeed, it may come from the sampling of the micro-images and the vignetting of the main-lens within the plenoptic camera. Hence, it is a purpose of the proposed technique to reduce the effect of the light flux variation when a device encodes a matrix of image views obtained/derived from a plenoptic camera.

In a preferred embodiment, the method is remarkable in that said combination corresponds to an averaging of all the image views comprised in said matrix.

In a preferred embodiment, the method is remarkable in that said obtaining comprises determining several reference image views by using an invertible mixing matrix for combining image views from said matrix, and wherein said encoding uses said several reference image views.

In a preferred embodiment, the method is remarkable in that said encoding is compliant with HEVC encoding techniques or H.264 encoding techniques.

In a preferred embodiment, the method is remarkable in that it further comprises generating metadata comprising information data related to said combination.

In another embodiment of the disclosure, it is proposed a method for decoding a matrix of encoded image views obtained from data acquired by a plenoptic camera. The method is remarkable in that it comprises:

decoding said encoded image views, delivering a first matrix of image views;

obtaining a matrix of image views as a function of said first matrix of image views and metadata comprising information data related to a combination of image views in said first matrix of image views.

In a preferred embodiment, the method for decoding is remarkable in that it further comprises obtaining said metadata from a memory unit.

In a preferred embodiment, the method for decoding is remarkable in that said decoding is compliant with HEVC decoding techniques or H.264 decoding techniques.

According to an exemplary implementation, the different steps of the method are implemented by a computer software program or programs, this software program comprising software instructions designed to be executed by a data processor of a relay module according to the disclosure and being designed to control the execution of the different steps of this method.

Consequently, an aspect of the disclosure also concerns a program liable to be executed by a computer or by a data processor, this program comprising instructions to command the execution of the steps of a method as mentioned here above.

This program can use any programming language whatsoever and be in the form of a source code, object code or code that is intermediate between source code and object code, such as in a partially compiled form or in any other desirable form.

The disclosure also concerns an information medium readable by a data processor and comprising instructions of a program as mentioned here above.

The information medium can be any entity or device capable of storing the program. For example, the medium can comprise a storage means such as a ROM (which stands for "Read Only Memory"), for example a CD-ROM (which stands for "Compact Disc-Read Only Memory") or a microelectronic circuit ROM or again a magnetic recording means, for example a floppy disk or a hard disk drive.

Furthermore, the information medium may be a transmissible carrier such as an electrical or optical signal that can be conveyed through an electrical or optical cable, by radio or by other means. The program can be especially downloaded into an Internet-type network.

Alternately, the information medium can be an integrated circuit into which the program is incorporated, the circuit being adapted to executing or being used in the execution of the method in question.

According to one embodiment, an embodiment of the disclosure is implemented by means of software and/or hardware components. From this viewpoint, the term "module" can correspond in this document both to a software component and to a hardware component or to a set of hardware and software components.

A software component corresponds to one or more computer programs, one or more sub-programs of a program, or more generally to any element of a program or a software program capable of implementing a function or a set of functions according to what is described here below for the module concerned. One such software component is executed by a data processor of a physical entity (terminal, server, etc.) and is capable of accessing the hardware resources of this physical entity (memories, recording media, communications buses, input/output electronic boards, user interfaces, etc.).

Similarly, a hardware component corresponds to any element of a hardware unit capable of implementing a function or a set of functions according to what is described here below for the module concerned. It may be a programmable hardware component or a component with an integrated circuit for the execution of software, for example an integrated circuit, a smart card, a memory card, an electronic board for executing firmware etc. In a variant, the hardware component comprises a processor that is an integrated circuit such as a central processing unit, and/or a microprocessor, and/or an Application-specific integrated circuit (ASIC), and/or an Application-specific instruction-set processor (ASIP), and/or a graphics processing unit (GPU), and/or a physics processing unit (PPU), and/or a digital signal processor (DSP), and/or an image processor, and/or a coprocessor, and/or a floating-point unit, and/or a network processor, and/or an audio processor, and/or a multi-core processor. Moreover, the hardware component can also comprise a baseband processor (comprising for example memory units, and a firmware) and/or radio electronic circuits (that can comprise antennas) which receive or transmit radio signals. In one embodiment, the hardware component is compliant with one or more standards such as ISO/IEC 18092/ECMA-340, ISO/IEC 21481/ECMA-352, GSMA, StoLPaN, ETSI/SCP (Smart Card Platform), GlobalPlatform (i.e. a secure element). In a variant, the hardware component is a Radio-frequency identification (RFID) tag. In one embodiment, a hardware component comprises circuits that enable Bluetooth communications, and/or Wi-fi communications, and/or Zigbee communications, and/or USB communications and/or Firewire communications and/or NFC (for Near Field) communications.

It should also be noted that a step of obtaining an element/value in the present document can be viewed either as a step of reading such element/value in a memory unit of an electronic device or a step of receiving such element/value from another electronic device via communication means.

In another embodiment of the disclosure, it is proposed an electronic device for encoding a matrix of image views obtained from data acquired by a plenoptic camera. The electronic device comprises a processor and at least one memory unit coupled to said processor. In addition, the processor is configured to:

obtain at least one reference image view from a combination of at least two image views from said matrix of image views;

encode image views that are different from said at least one reference image view, based on said at least one reference image view.

In a preferred embodiment, the electronic device for encoding is remarkable in that said combination corresponds to an averaging of all the image views comprised in said matrix.

In a preferred embodiment, the electronic device for encoding is remarkable in that said processor is further configured to determine several reference image views by using an invertible mixing matrix for combining image views from said matrix, and wherein said processor is further configured to use said several reference image views when it is configured to encode image views.

In a preferred embodiment, the electronic device for encoding is remarkable in that said processor is further configured to generate metadata comprising information data related to said combination.

In another embodiment of the disclosure, it is proposed an electronic device for decoding a matrix of encoded image views obtained from data acquired by a plenoptic camera. The electronic device comprises a processor and at least one memory unit coupled to said processor. In addition, the processor is configured to:

decode said encoded image views, delivering a first matrix of image views;

obtain a matrix of image views as a function of said first matrix of image views and metadata comprising information data related to a combination of image views in said first matrix of image views.

In a preferred embodiment, the electronic device for decoding is remarkable in that the processor is further configured to obtain said metadata from a memory unit.

In a preferred embodiment, the electronic device for decoding is remarkable in that the processor is further configured to decode according to HEVC decoding techniques or H.264 decoding techniques.

BRIEF DESCRIPTION OF THE DRAWINGS

The above and other aspects of the invention will become more apparent by the following detailed description of exemplary embodiments thereof with reference to the attached drawings in which:

FIG. 16 presents an example of values used for converting the $p^2$ views V(i,j) into the sub-apertures images S(i,j);

DETAILED DESCRIPTION

Figure 1:
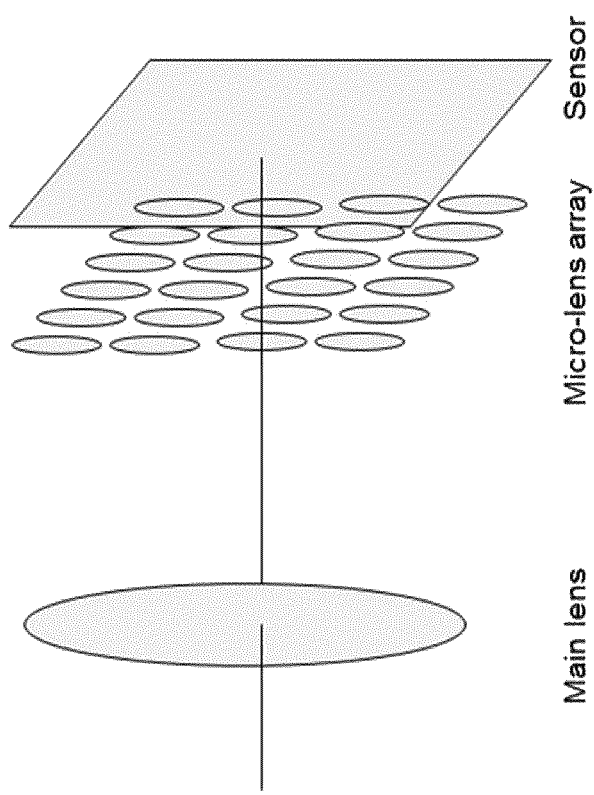
FIG. 1 depicts in a schematic way features comprised in a plenoptic camera according to the state of the art.

FIG. 1 depicts in a schematic way features comprised in a plenoptic camera according to the state of the art.

Usually, a plenoptic camera comprises a micro-lens array which is positioned between a main lens and an image sensor. The sensor of a plenoptic camera records an image which is made of a collection of 2D small images arranged within a 2D image. The 2D small images are called micro-lens images, and they are generated by the lenses from the micro-lens array. Usually, the lenses and the corresponding micro-lens images can be identified within a 2D coordinate system (such as a Cartesian coordinate system, where a lens is identified by a couple of integer (i,j)). Hence, a pixel of the image sensor (which can also be identified within a 2D coordinate system) can be associated with 4 coordinates (x, y, i, j). Therefore, a pixel of the image sensor can record L (x, y, i, j) which is a 4D light-field.

Figure 2:
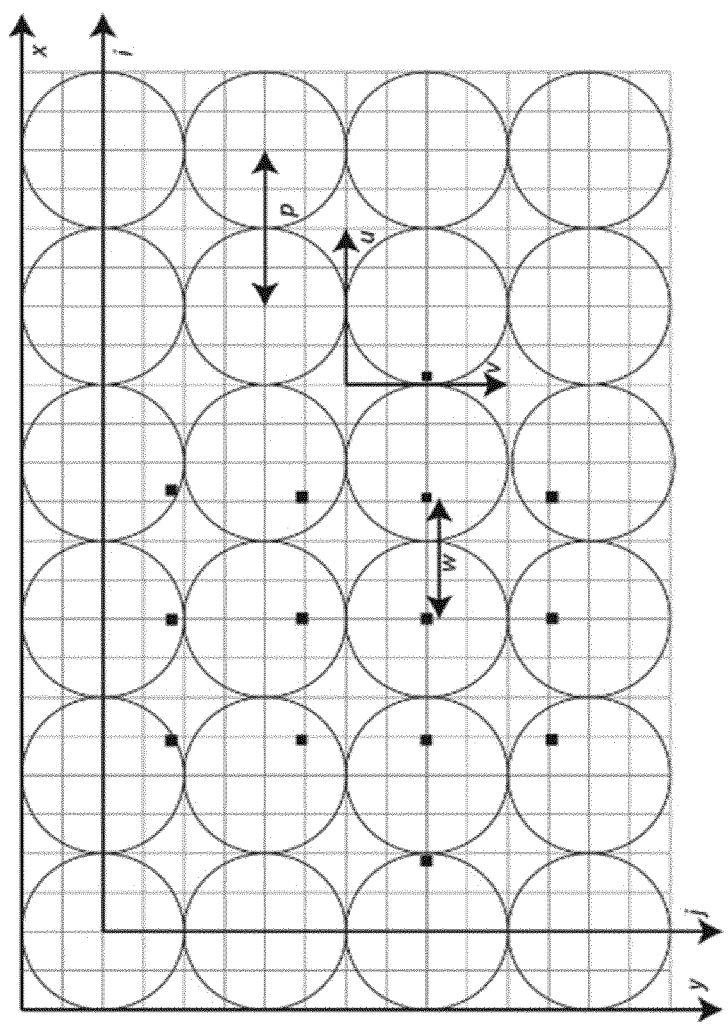
FIG. 2 presents how micro-images generated by micro-lenses are recorded by an image sensor within a plenoptic camera according to the state of the art.

FIG. 2 illustrates the image which is recorded by the sensor. Indeed, FIG. 2 presents how micro-images generated by micro-lenses are recorded by an image sensor within a plenoptic camera according to the state of the art.

The main lens is an ideal thin lens with a focal distance F and a diameter D. The F-number of the main lens is O=F/Φ).

The micro lens array is made of micro-lenses having a focal distance f. The pitch of the micro-lenses is φ. The F-number of the micro-lens is o=f/φ (assuming that the diameter of the micro-lens is equal to the micro-lens pitch). The micro-lens array is located at the fix distance D from the main lens. The micro-lenses might have any shape like circular or squared. The diameter of the shape is lower or equal to $\phi$. One can consider the peculiar case where the micro-lenses are pinholes. In this context, the following equation remains valid with f=d.

The sensor is made of a square lattice of pixels having a physical size of $\delta$. $\delta$ is in unit of meter per pixel. The sensor is located at the fix distance d from the micro-lens array.

The object (not visible in FIG. 3 and FIG. 4) is located at the distance z of the main lens. This object is focused by the main lens at a distance z' from the main lens. The disparity of the object between two consecutive lenses is equal to W. The distance between 2 micro-lens image centers is p.

Each micro-lens produces a micro-image represented by a circle (the shape of the small image depends on the shape of the micro-lenses which is typically circular). Pixel coordinates are labelled (x,y). p is the distance between the centers of two consecutive micro-images, p is not necessary an integer value. Usually, micro-lenses are chosen such that p is larger than a pixel size $\delta$. Micro-lens images are referenced by their coordinate (i,j). Each micro-lens image samples the pupil of the main-lens with a (u, v) coordinate system. Some pixels might not receive any photons from any micro-lens; those pixels are discarded. Indeed, the inter micro-lens space is masked out to prevent photons to pass outside from a micro-lens (if the micro-lenses have a square shape, no masking is needed). The center of a micro-lens image (i,j) is located on the sensor at the coordinate $(x_{i,j}, y_{i,j})$. $\theta$ is the angle between the square lattice of pixel and the square lattice of micro-lenses, in FIG. 2, $\theta=0$. Assuming the micro-lenses are arranged according to a regular square lattice, the $(x_{i,j}, y_{i,j})$ can be computed by the following equation considering $(x_{0,0}, y_{0,0})$ the pixel coordinate of the micro-lens image (0,0):

$$\begin{bmatrix} x_{i,j} \\ y_{i,j} \end{bmatrix} = p \begin{bmatrix} \cos\theta & -\sin\theta \\ \sin\theta & \cos\theta \end{bmatrix} \begin{bmatrix} i \\ j \end{bmatrix} + \begin{bmatrix} x_{0,0} \\ y_{0,0} \end{bmatrix} \quad (1)$$

FIG. 2 also illustrates that an object from the scene is visible on several contiguous micro-lens images (represented by the dark dots). The distance between 2 consecutive views of an object is noted w, this distance will be named the replication distance in this document. An object is visible on r consecutive micro-lens images with:

$$r = \left\lfloor \frac{p}{|p-w|} \right\rfloor \quad (2)$$

r is the number of consecutive micro-lens images in one dimension. An object is visible in $r^2$ micro-lens images. Depending on the shape of the micro-lens image, some of the $r^2$ views of the object might be invisible.

Optical Property of a Plenoptic Camera

The distances p and w introduced in the previous sub-section are given in unit of pixel. They are converted into physical unit distance (meters) respectively P and W by multiplying them by the pixel size $\delta$: W=$\delta$w and P=$\delta$p. These distances depend on the plenoptic camera characteristics.

Figure 3:
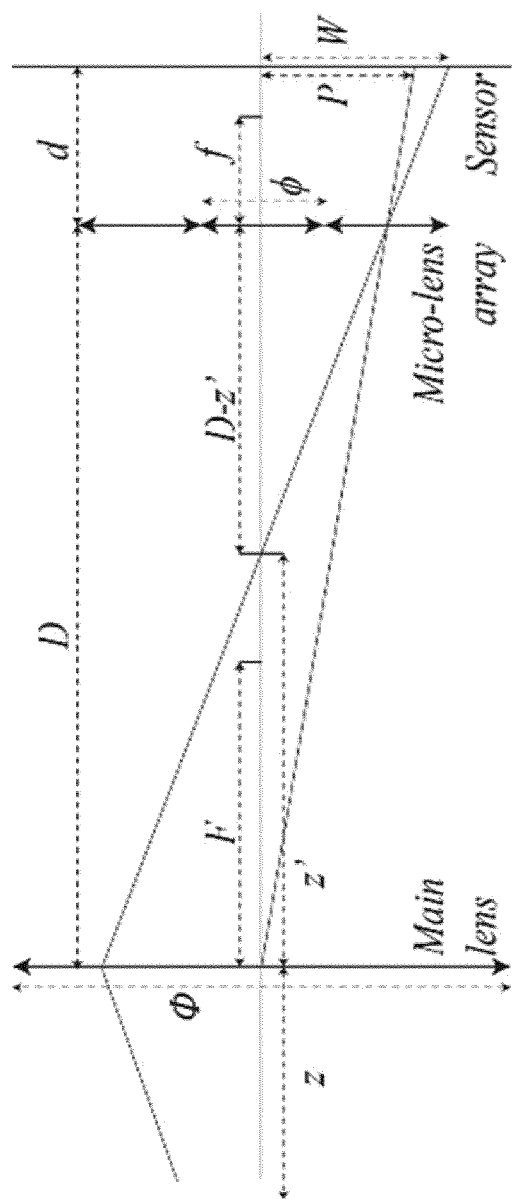
FIG. 3 presents a first schematic plenoptic type II camera according to the state of the art.
Figure 4:
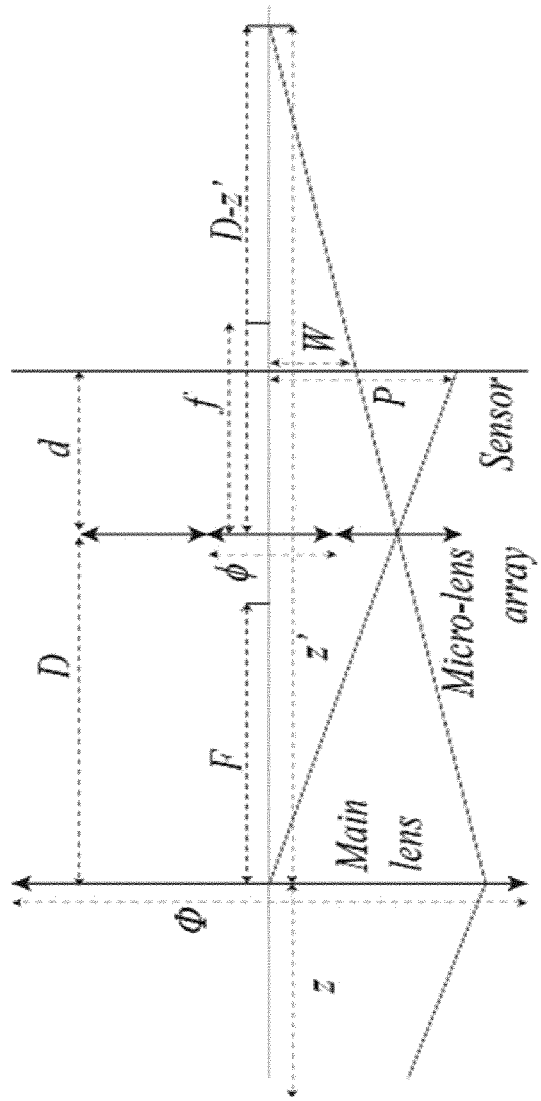
FIG. 4 presents a second schematic plenoptic type II camera according to the state of the art.

FIG. 3 presents a schematic plenoptic type II camera with W>P according to the state of the art, and FIG. 4 presents a schematic plenoptic type II camera with W<P according to the state of the art.

In the plenoptic camera of FIGS. 3 and 4, the main-lens has a focal length F and an aperture $\Phi$. The micro-lens array comprises micro-lenses having a focal length f. The pitch of the micro-lens array is $\phi$. The micro-lens array is positioned at a distance D from the main-lens, and a distance d from the sensor. The object (not visible on the figures) is located at a distance z from the main-lens (i.e. at the left of the main lens in the Figures). This object is focused by the main-lens at a distance z' from the main-lens (i.e. at the right of the main lens). FIG. 3 and FIG. 4 illustrate the cases where respectively D>z' and D<z'. In both cases, micro-lens images can be in focus depending on d and f. This design refers to the so-called type II plenoptic camera.

Figure 5:
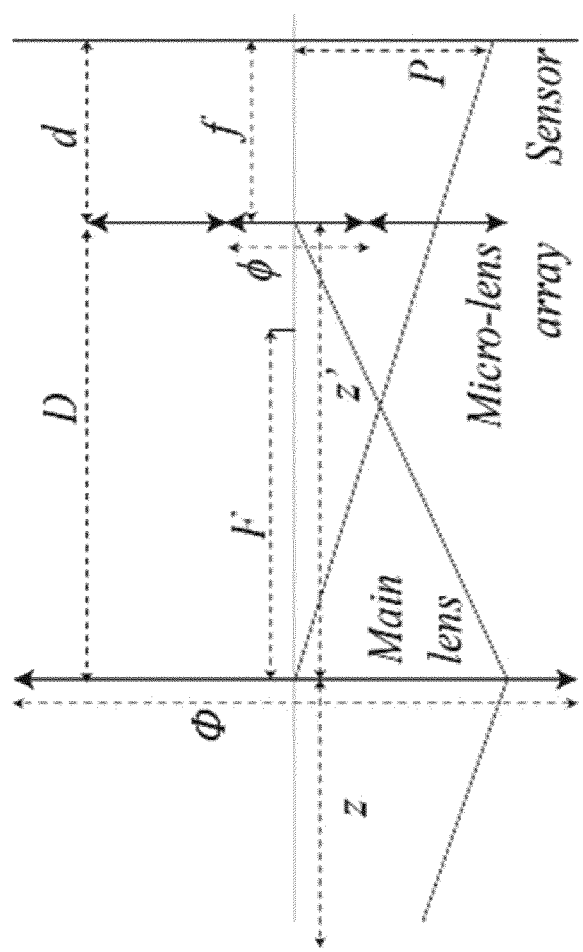
FIG. 5 presents a schematic plenoptic type I camera according to the state of the art.

A similar design consists in fixing f=d, one speaks about the so-called type I plenoptic camera (see FIG. 5). This design is made such that the main-lens is focusing images close to the micro-lens array. If the main-lens is focusing exactly on the micro-lens array, then W=$\infty$. Also the micro-lens images are fully out-of-focus and equal to a constant (not considering noise).

The replication distance W varies with the z the distance of the object. To establish the relation between W and z, one relies on the thin lens equation:

$$\frac{1}{z} + \frac{1}{z'} = \frac{1}{F} \quad (3)$$

And the Thales law:

$$\frac{D-z'}{\phi} = \frac{D-z'+d}{W} \quad (4)$$

Mixing the 2 previous equations on deduces:

$$W = \phi \left( 1 + \frac{d}{D - \frac{zF}{z-F}} \right) \quad (5)$$

The relation between W and z does not assume that the micro-lens images are in focus. Micro-lens images are strictly in focus according to the thin lens equation:

$$\frac{1}{D-z'} + \frac{1}{d} = \frac{1}{f} \quad (6)$$

Also from the Thales law one derives P $$e = \frac{D+d}{D} \quad (7)$$
$$P = \phi e$$

The ratio e defines the enlargement between the micro-lens pitch and the micro-lens images pitch. This ratio is very close to 1 since D>>d.

Sub-Aperture Images

The micro-images can be re-organized into the so-called sub-aperture images (also named image views). A sub-aperture image collects all 4D light-field pixels having the same (u, v) coordinates (i.e. the pixels that are associated with the same part of a decomposition of the pupil). Let I×J being the number of micro-lenses covering the sensor, and $N_x \times N_y$ the number of pixels of the sensor. The number of sub-aperture images is equal to p×p. Each sub-aperture image have a size of (I,J)=($N_x$/p,$N_y$/p) pixels.

Figure 6A:
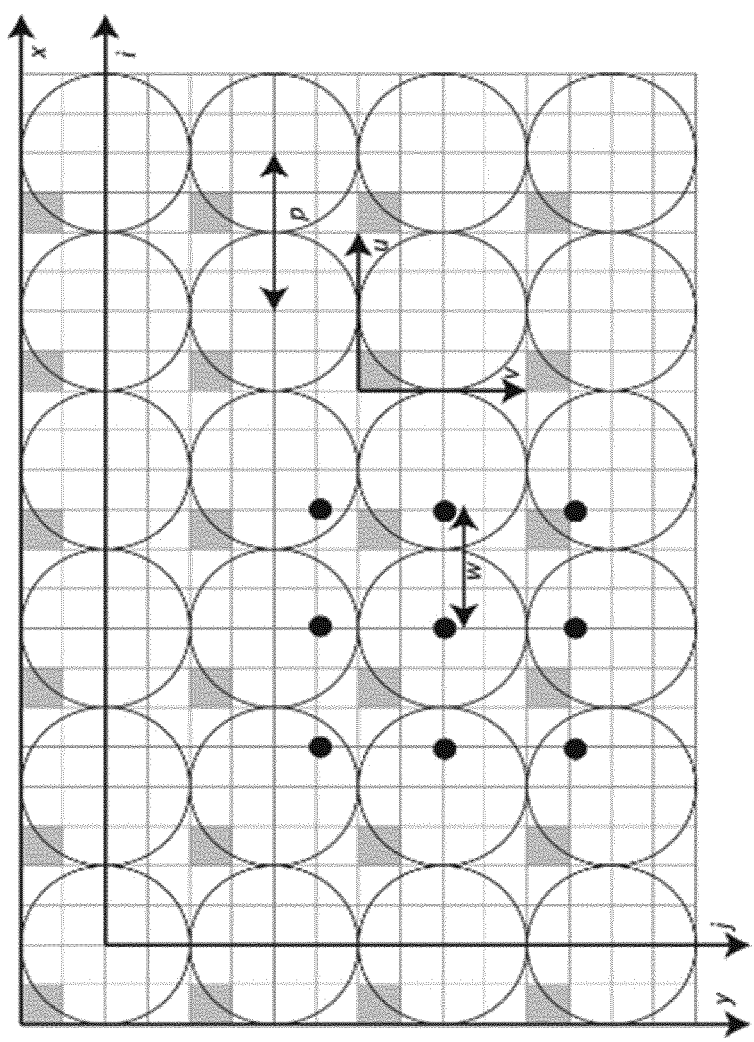
FIGS. 6(a) and 6(b) present an example of the conversion of light-field pixels into sub-aperture images.
Figure 6B:
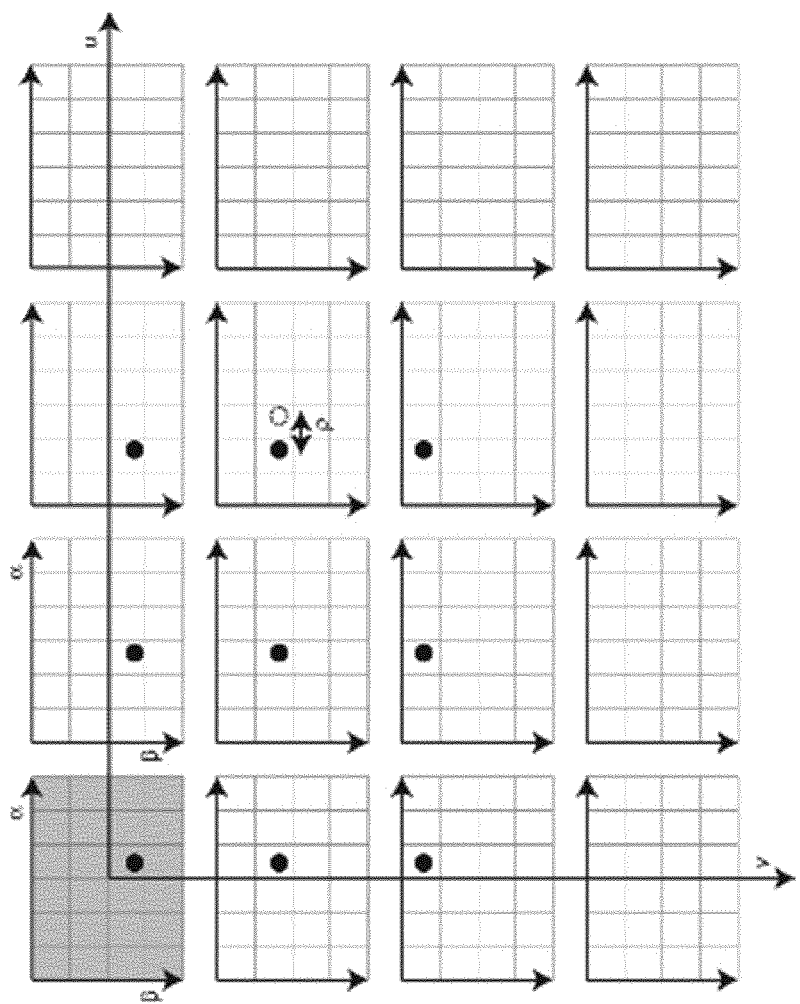

FIGS. 6(a) and 6(b) illustrate the conversion between the captured light-field image coordinate L(x, y, i, j) (see FIG. 6(a)) into the series of sub-aperture images S($\alpha$, $\beta$, u, v) (see FIG. 6(b)). Each sub-aperture image has a size of (I,J) pixels, the axis are labeled ($\alpha,\beta$) with ($\alpha,\beta$)∈[0,I[×[0,J[. S(u,v) denotes the 2D image corresponding to the (u, v) pupil coordinate made of I×J pixels.

The relations between (x, y, i, j) and ($\alpha$, $\beta$, u, v) are defined as follow:

$$(\alpha, \beta, u, v) = \left(\left\lfloor \frac{x}{p} \right\rfloor, \left\lfloor \frac{y}{p} \right\rfloor, x \bmod p, y \bmod p\right) \quad (8)$$

Where $\lfloor \cdot \rfloor$ denotes the floor function, and mod denotes the modulo function.

If p is not exactly an integer but close to an integer, then the sub-aperture images can be computed easily considering the distance between the micro-lens image equal to $\lfloor p \rfloor$ the integer just smaller than p. This case occurs especially when the micro-lens diameter $\phi$ is equal to an integer number of pixels. In the case, p=$\phi$e being slightly larger than $\phi$ since e=(D+d)/d is slightly greater than 1. The advantage of considering $\lfloor p \rfloor$ is that the sub-aperture images are computed without interpolation since one pixel L(x, y, i, j) corresponds to an integer coordinate sub-aperture pixel S($\alpha$, $\beta$, u, v). The drawback is that the portion of a pupil from which photons are recorded is not constant within a given sub-aperture image S(u, v). To be precise, S(u, v) sub-aperture image is not exactly sampling the (u, v) pupil coordinate. Nevertheless, even though the sub-apertures images are sampling a (u, v) coordinate which varies slightly with the pixel coordinate ($\alpha$, $\beta$) the proposed technique is effective. If p is not an integer, or if the micro-lens array is rotated versus the pixel array, then the sub-aperture images need to be determined or computed using interpolation since the centers ($x_{i,j}$,$u_{i,j}$) of the micro-lenses are not integer.

In the following, we consider that the sub-aperture images are computed considering $\lfloor p \rfloor$ the integral part of micro-image pitch. The advantage is that the sub-aperture images are extracted without any loss in signal, and the raw image can be recovered also without any signal degradation. In addition, by abuse of notation, we consider that $\lfloor p \rfloor$ and p are equivalent.

Image Re-Focusing
Disparity on the Sub-Aperture Images
Within the light-field image L(x, y, i, j) an object is made visible on several micro-images with a replication distance w. On the sub-aperture images, an object is also visible several times. From one sub-aperture image to the next horizontal one, an object coordinate ($\alpha,\beta$) appears shifted by the disparity $\rho$. The relation between $\rho$ and w is defined by:

$$\rho = \frac{1}{w-p} \quad (9)$$

Also it is possible to establish a relation between the disparity p and the distance z of the object by mixing equations (5) and (9):

$$\rho = \frac{\delta D}{\phi d}\left(\frac{D}{z'} - 1\right) \quad (10)$$

Projecting the Light-Field Pixels on Re-Focus Image
Image refocusing consists in projecting the light-field pixels L(x, y, i, j) recorded by the sensor into a 2D refocused image of coordinate (X, Y). The projection is performed by shifted the micro-images (i,j):

$$\begin{bmatrix} X \\ Y \end{bmatrix} = s\begin{bmatrix} x \\ y \end{bmatrix} - sw_{focus}\begin{bmatrix} i \\ j \end{bmatrix} \quad (11)$$

Where $w_{focus}$ is the selected replication distance corresponding to $z_{focus}$ the distance of the objects that appear in focus in the computed refocused image. s is a zoom factor which controls the size of the refocused image. The value of the light-field pixel L(x, y, i, j) is added on the refocused image at coordinate (X, Y). If the projected coordinate is non-integer, the pixel is added using interpolation. To record the number of pixels projected into the refocus image, a weight-map image having the same size than the refocus image is created. This image is preliminary set to 0. For each light-field pixel projected on the refocused image, the value of 1.0 is added to the weight-map at the coordinate (X, Y). If interpolation is used, the same interpolation kernel is used for both the refocused and the weight-map images. After, all the light-field pixels are projected, the refocused image is divided pixel per pixel by the weight-map image. This normalization step, ensures brightness consistency of the normalized refocused image.

Addition of the Sub-Aperture Images to Compute the Re-Focus Image
Equivalently, the refocused images can be computed by summing-up the sub-aperture images S($\alpha,\beta$) taking into consideration the disparity $\rho_{focus}$ for which objects at distance $z_{focus}$ are in focus.

$$\begin{bmatrix} X \\ Y \end{bmatrix} = s\begin{bmatrix} \alpha \\ \beta \end{bmatrix} + s\rho_{focus}\begin{bmatrix} u \\ v \end{bmatrix} \quad (12)$$

The sub-aperture pixels are projected on the refocused image, and a weight-map records the contribution of this pixel, following the same procedure described above.

Flux-Scale Variation Between Sub-Aperture Images
Usually, the sub-aperture images are showing flux variation between themselves. The flux variation between the sub-aperture induced by either the sampling of the micro-images and/or the vignetting of the main-lens, can be an issue when an encoding (i.e. a compression) of the sub-aperture images has to be performed.

Figure 7:
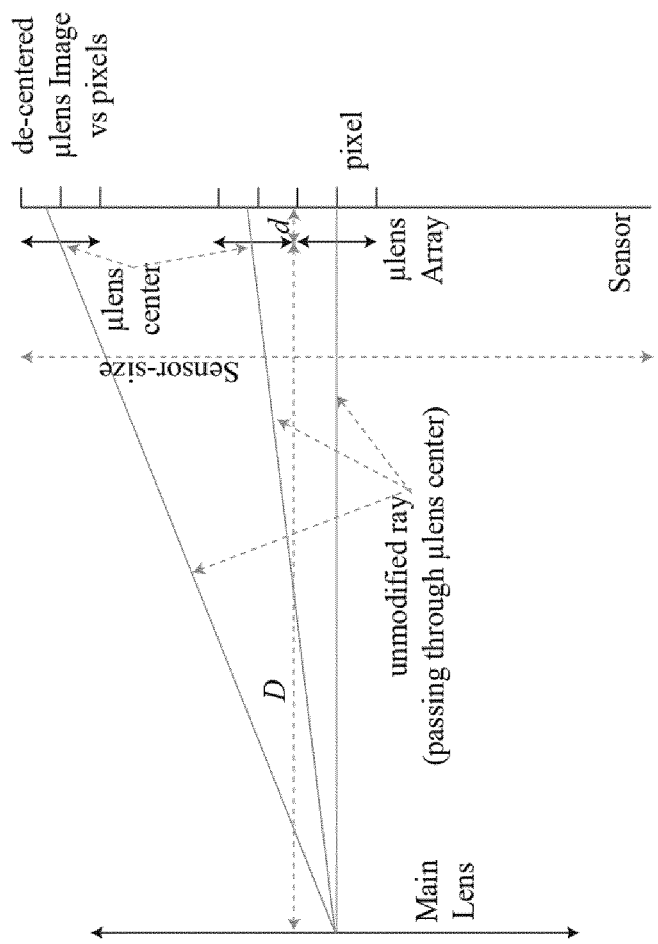
FIG. 7 presents an example of sampling of light field pixels.

Sampling of the Micro-Images
When building a light-field sensor, it is common to stick a micro-lens array where the micro-lens diameter $\phi$ is strictly equal $\phi$=k$\delta$ where $\delta$ is the physical size of a pixel, and k an integer. FIG. 7 illustrates a case where k=2; $\phi$=2$\delta$. Micro-lenses cover 2×2 pixels. The figure illustrates unmodified rays passing through the center of the main-lens and the centers of some micro-lenses (assuming thin lens optic). The unmodified rays indicate the positions of the micro-images. One notices that the micro-images centers are equal to the middle of the 2×2 pixels only at the center of the sensor close to the optical axis of the main-lens.

To illustrate this effect, a synthetic plenoptic image captured with an ideal plenoptic camera has been simulated using a PBRT (Physically Based Rendering software) extended to simulate plenoptic camera. One considers the following features for such plenoptic cameras:

| Parameters | Value | Parameters | Value |
| --- | --- | --- | --- |
| δ | 6 μm | Φ | 12 mm |
| φ | 12 μm | O = Φ/F | 2 |
| f = d | 18 μm | D = z' | 24.365 mm |
| o = f/φ | 1.5 | z | 1600 mm |
| F | 24 mm | (I, J) | 1000 × 1000 |
| $(N_x, N_y)$ | 2000 × 2000 | Sensor Size | 12 × 12 mm |

Figure 8:
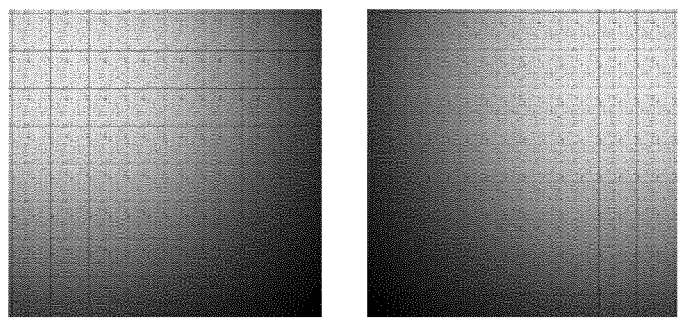
FIG. 8 presents an example of a matrix of image views comprising 4 image views (or sub-aperture images): S(0, 0), S(1, 0), S(0,1) and S(1,1)
Figure 8:
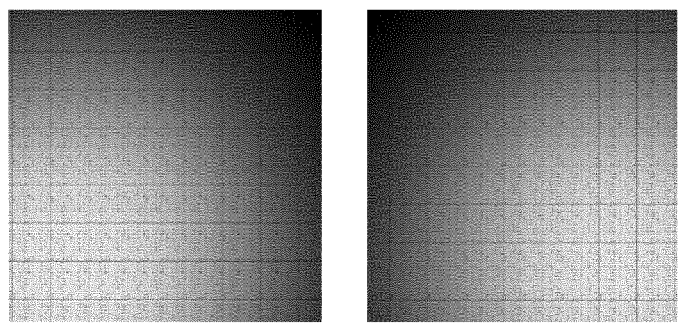
Figure 9:
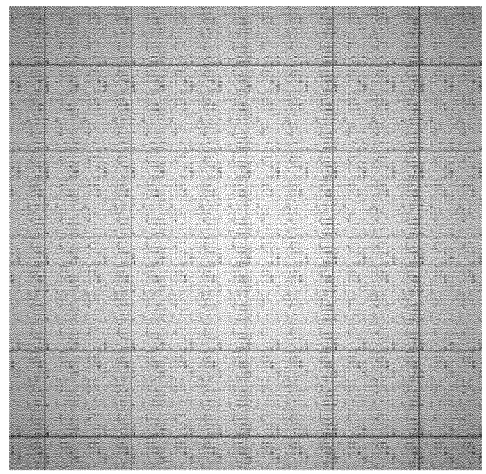
FIG. 9 presents an image view corresponding to the sum of the 4 image views (or sub-aperture images) S(0, 0), S(1, 0), S(0,1) and S(1, 1) of FIG. 8.

The simulation is made with a so-called type 1 plenoptic camera (i.e. with f=d as depicted in FIG. 5) but the proposed disclosure is not limited to that constraints. The main-lens is considered as an ideal perfect thin lens. The synthetic image is made of a test chart uniformly illuminated. FIG. 8 illustrates the 2×2 sub-aperture images extracted from the raw color plenoptic image. One observes that the light flux varies throughout each sub-aperture image.
However, it appears that the sum of the 4 sub-aperture images is almost constant (as presented in FIG. 9). More precisely, the image resulting from the sum is not strictly constant since the micro-images have a size of 2eO/o×2eO/o pixels (where e=D+d/D) and are not exactly centered in the middle of 2×2 pixels. Thus some photons belonging to the micro-lenses observed at the border of the sensor are lost. Nevertheless, the variation of light flux of the sum of the 4 images is almost negligible, and could be null if the aperture of the main-lens decreases (Φ being smaller).

Summing the p×p sub-aperture images into a single image is equivalent to having a 2D camera with the main-lens and pixel array having a pixel size p times larger than the light-field sensor. Thus the sum of the sub-aperture images is showing common images as captured by 2D cameras.

Sampling of the Micro-Images for Homogeneous Flux in the Sub-Aperture Images

To correct the flux variation between the sub-apertures, the diameter φ of the micro-lenses must be decreased a little such that P=2δ. According to equation (7) one deduces that: φ=$P^D$/D+d=11.99114 μm. This result could be generalized for a main-lens with a complex optical design. In this case, the distance D is equal to the exit pupil distance of the main-lens.

Figure 10:
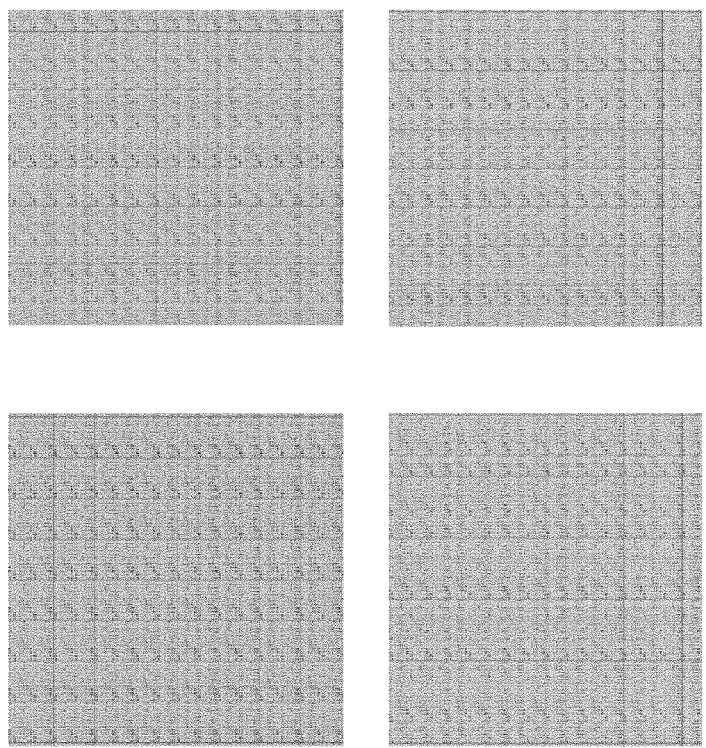
FIG. 10 presents an example of a matrix of image views comprising 4 image views S(0, 0), S(1, 0), S(0,1) and S(1, 1) obtained from a plenoptic camera for which micro-images are exactly equal to 2×2 pixels, according to one embodiment of the disclosure.

FIG. 10 illustrates the 4 sub-aperture images obtained with a light-field sensor with micro-image centers being exactly centered on the middle of 2×2 pixels. In that case, no flux variation is observed.

Figure 11:
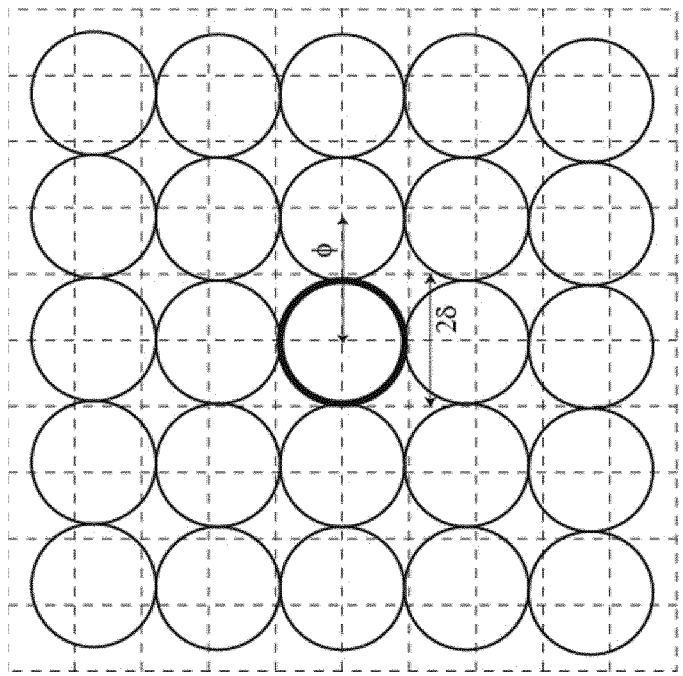
FIG. 11 presents the micro-lens array having a step slightly smaller than 2 pixels, such that the corresponding micro-lens images have a step of exactly 2 pixels (which permit to produce sub-aperture images with no flux variation)

In such a design, the step of the micro-lens array is slightly smaller the distance between 2 pixels. The micro-lens array is positioned such that the micro-lens at the center of the micro-lens array, is exactly aligned with 2×2 pixels at the middle of the sensor. FIG. 11 schematically illustrates how the micro-lens array is located versus the pixel array. The bold micro-lens at the middle of the micro-lens array is strictly positioned such that its center is aligned with the middle of 2×2 pixels of the pixel array. In this figure, circles show the micro-lenses, not the micro-images.

By design, the size of the micro-images can be adapted to be equal to an integer number of pixels, but this design is valid only for a fixed distance D between the main-lens and the micro-lens array (or the exit pupil distance considering a real main-lens). If the main-lens is moved to focus on nearby objects, the distance D varies and the sub-aperture images will receive un-homogeneous flux. Also, if the main-lens can be replaced by other main-lenses (like for interchangeable lens cameras), the distance D will vary (except the ideal case where all the main-lenses share the same exit pupil distance). Thus, it is common that the flux of the sub-aperture images is not homogeneous through the full field of view.

As explained in the background section of the present document, several solutions can be used for encoding a matrix of image views (i.e. a set of sub-aperture images) obtained from a light field content by a plenoptic camera.

Figure 12:
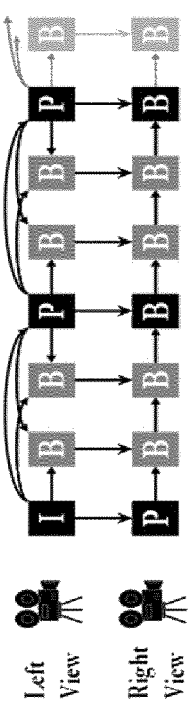
FIG. 12 presents an example of inter-dependencies in stereo video coding scheme.
Figure 13:
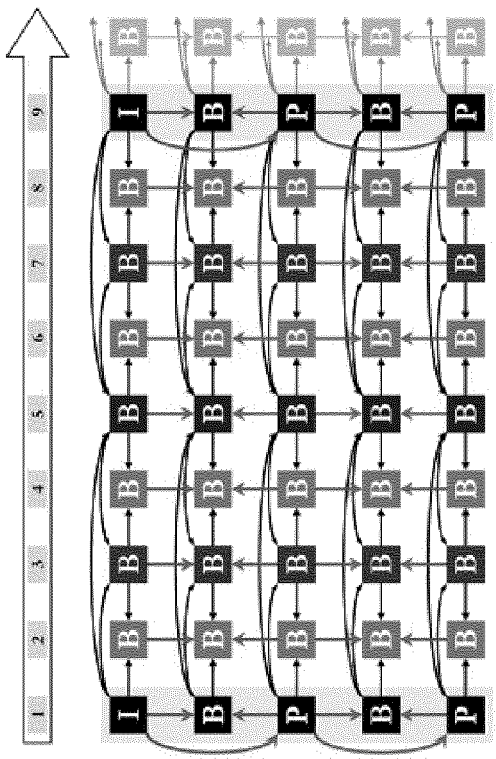
FIG. 13 presents an example of inter-dependencies in multi-view video coding scheme.

The FIGS. 12 and 13 illustrate principles used in the encoding of multi-view content (such as a stereoscopic content in FIG. 12, and a 5 views content in FIG. 13).

The Multiview Video Coding (MVC) and more recently Multiview High Efficiency Video Coding (MV-HEVC) standards are dedicated to several images of the same scene as typically taken by a matrix of cameras. To exploit inter-camera redundancy, these standards define inter-view prediction. This ability is needed since the various views of the scene are redundant even though the parallax from different views is varying. Inter-view prediction is the key-element of MVC and MV-HEVC, which allows decreasing the bit-rate of the bitstream by an average of 25% compared to the independent coding of the views, at a similar quality level.

Multiview codecs define one reference view, namely the base view, to be coded according to conventional 2D video codec. The other views can benefit from previously encoded/decoded reference views, including the base view, using inter-view prediction.

FIG. 12 illustrates an exemplary setup with two views (stereo video). The left view corresponds to the base view and only temporal prediction is performed, depicted by horizontal and curvy arrows. The frames of the right view, which is a dependent view, can be predicted from temporal and inter-view reference frames.

When stereo is extended to multi-view, more advanced combinations of inter-view and temporal predictions have been standardized. FIG. 13 shows the case where 5 views are considered that are obtained from 5 different cameras noted Cam 1, . . . , Cam 5. Cam 1 corresponds to the base view. Vertical relations correspond to inter-view prediction. For instance, at time 1, view 3 (associated with Cam 3) can be predicted from view 1, and view 2 depends on view 1 and view 3.

However, applying Multiview coding techniques straightforwardly for encoding the sub-apertures images raises the issue of defining which sub-aperture images have to be used as references. This selection is not obvious, especially if one considers the strong variation of flux through a sub-aperture image in case of non-homogenous sub-aperture sampling (the micro-image centers do not correspond to the middle of p×p blocks of pixels). For instance, FIG. 8 illustrates 4 sub-aperture images, which show strong flux variation throughout the field of view. Selecting one of the sub-aperture images as the reference/base view for the multi-view codec is not optimal, especially if the sub-aperture images tend to darken in one corner of the image.

Figure 14:
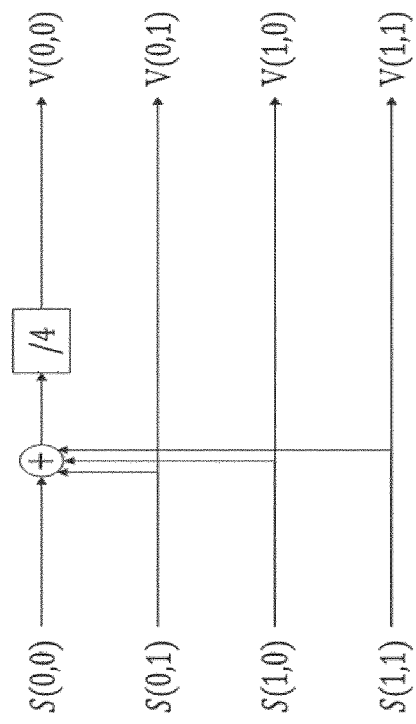
FIG. 14 illustrates one embodiment of the disclosure in which the sub-aperture images S(i,j) are combined in order to generate the image views V(i,j) to be encoded.
Figure 17:
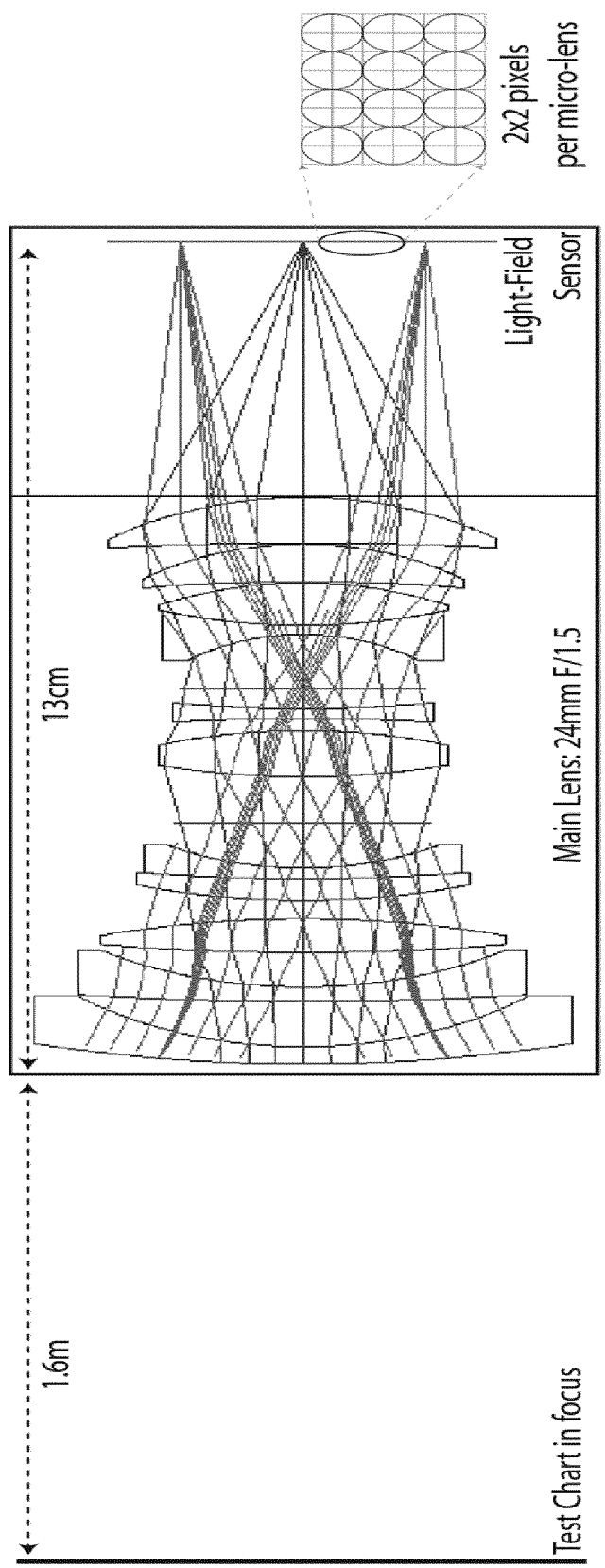
FIG. 17 presents an example of the plenoptic camera used for testing or benchmarking the present technique.

The proposed disclosure provides a solution to this issue. In one embodiment of the disclosure, it is proposed to use a multiview codec to encode the sub-aperture images with the base view image (or reference view image) being the image corresponding to the average of all the sub-aperture images. Let call V(i,j) with (i,j)∈[0,p[the $p^2$ views to be encoded by the Multiview codec. The $p^2$ sub-aperture image sequence S(i,j) are averaged to produce the reference view V(0,0)=i/$p^2$ $\Sigma_{i=0}^{P}$ $\Sigma_{j=0}^{P}$ S(i,j). Averaging of the sub-aperture image sequence ensures that the dynamic of the average is equal to the dynamic of the sub-aperture views. FIG. 14 illustrates one embodiment of the disclosure in which the sub-aperture images are combined in order to generate the views to be encoded.

Figure 15:
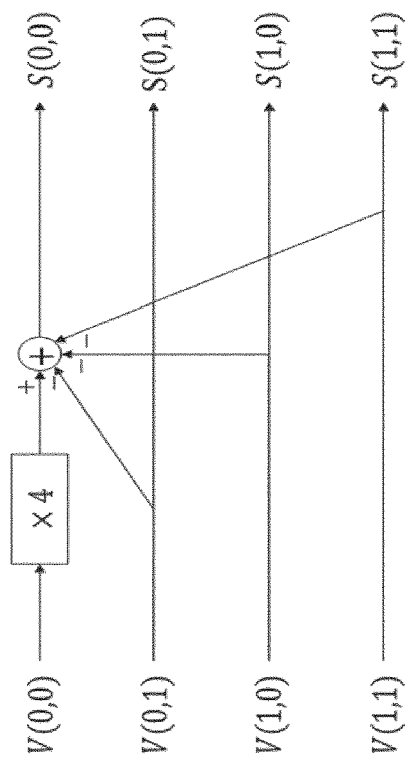
FIG. 15 illustrates one embodiment of the disclosure in which the image views V(i,j) are converted into sub-aperture images S(i,j)

In this exemplary solution, the other views are defined as $V(i,j)=S(i,j)$, where $(i,j)\neq[0,0]$. In other words, the base/reference image view is the average sum of all the sub-aperture images. The other views correspond to one sub-aperture image. Hence, in such embodiment of the disclosure, only the sub-aperture image $S(0,0)$ is not encoded directly, but it can be retrieved by subtracting the reference view, with all the coded views from the following relationship: $S(0,0)=(p^2-1)V(0,0)-\Sigma_{i=0}^{p}\Sigma_{j=0}^{p}V(i,j)$. FIG. 15 illustrates how the decoded views are combined to form the sub-aperture views.

One advantage of defining the reference view as the average sum of all the sub-aperture images is that the reference view encodes a 2D video signal, as a conventional video camera would have recorded. This reference image view can be extracted independently to the other views according to Multi-view video coding standards.

It is worth noting that the proposed disclosure is not limited to type 1 camera (f=d). Indeed, the type of the camera does not change the relation between V and S.

In the first embodiment of the disclosure, only the reference image view is a combination of the sub-aperture images. In another embodiment of the disclosure, it is proposed to generalize such process to other image views (in order to determine several reference image views). The general relation between the sub-aperture images $S(i,j)$ and the views $V(i,j)$ to be encoded are given by the following matrix:

$$\begin{bmatrix} V_0 \\ V_1 \\ \vdots \\ V_{p^2-1} \end{bmatrix} = \begin{bmatrix} m_{0,0} & m_{1,0} & \cdots & m_{p^2-1,0} \\ m_{0,1} & m_{1,1} & \cdots & m_{p^2-1,1} \\ \vdots & \vdots & \ddots & \vdots \\ m_{0,p^2-1} & m_{1,p^2-1} & \cdots & m_{p^2-1,p^2-1} \end{bmatrix} \begin{bmatrix} S_0 \\ S_1 \\ \vdots \\ S_{p^2-1} \end{bmatrix} \quad (13)$$

Where $V_{jp+1}=V(i,j)$ and $S_{jp+1}=S(i,j)$. The p×p coefficients $m_{i,j}$ are null or positive real numbers, they belong to the matrix M. The coefficient can be freely chosen as long as det(M) is not zero, and such that $\Sigma_{i=0}^{p}\Sigma_{j=0}^{p} m_{i,j}=1$.

Equation 13 gives the relation to compute the MVC image views to be encoded as a function of the sub-aperture images. This relation is used at the encoder side. At the decoder side, once a decoding process has been performed in order to recover the image views $V(i,j)$, the inverse of the matrix M has to be used for obtaining the sub-aperture images $S(i,j)$:

$$\begin{bmatrix} S_0 \\ S_1 \\ \vdots \\ S_{p^2-1} \end{bmatrix} = M^{-1} \begin{bmatrix} V_0 \\ V_1 \\ \vdots \\ V_{p^2-1} \end{bmatrix}. \quad (14)$$

One motivation of averaging several sub-aperture images into a single view is to prevent the encoding of a single sub-aperture image which might be strongly affected by an inhomogeneous illumination (i.e. a non-homogeneous light flux variation recorded by the image sensor) as illustrated in FIG. 8.

Hence, the embodiment of the disclosure described in FIG. 14 corresponds to the following 4×4 matrix M:

$$\begin{bmatrix} V(0,0) \\ V(0,1) \\ V(1,0) \\ V(1,1) \end{bmatrix} = \begin{bmatrix} 1/4 & 1/4 & 1/4 & 1/4 \\ 0 & 1 & 0 & 0 \\ 0 & 0 & 1 & 0 \\ 0 & 0 & 0 & 1 \end{bmatrix} \begin{bmatrix} S(0,0) \\ S(0,1) \\ S(1,0) \\ S(1,0) \end{bmatrix} \quad (15)$$

The inverse relation as illustrated in FIG. 15 is given by the following inverse matrix of M:

$$\begin{bmatrix} S(0,0) \\ S(0,1) \\ S(1,0) \\ S(1,0) \end{bmatrix} = \begin{bmatrix} 4 & -1 & -1 & -1 \\ 0 & 1 & 0 & 0 \\ 0 & 0 & 1 & 0 \\ 0 & 0 & 0 & 1 \end{bmatrix} \begin{bmatrix} V(0,0) \\ V(0,1) \\ V(1,0) \\ V(1,1) \end{bmatrix} \quad (16)$$

In the following, some remarks concerning a specific choice of matrix M are discussed:

In one embodiment of the disclosure, the averaging of the sub-aperture images should be chosen such that the averaged sub-aperture images are contiguous. Indeed, summing sub-aperture images is analogous to defining a special shape in the pupil of the main-lens. This shape should be compact to prevent the corresponding averaged image to show "duplicated" views of object which are out of focus.

For instance, if p=4, it is convenient to define $V(0,0)=(S(0,0)+S(1,0)+S(0,1)+S(1,1))/4$. Then, $V(0,0)$ corresponds to an image observed with the same camera, having 2×2 larger pixels, and thus corresponding to p=2. In contrast: defining $V(0,0)=(S(0,0)+S(3,0)+S(0,3)+S(3,3))/4$ is not optimal since it corresponds to non-contiguous sub-aperture images. An object being out-of-focus will appear as averaged 4 times on (0,0), decreasing the efficiency of predictive coding.

p=2, then 3 sub-aperture images are averaged in order to produce views with almost no dark corners;

$$M_{2\times2} = \begin{bmatrix} 0 & 1/3 & 1/3 & 1/3 \\ 1/3 & 0 & 1/3 & 1/3 \\ 1/3 & 1/3 & 0 & 1/3 \\ 1/3 & 1/3 & 1/3 & 0 \end{bmatrix} M_{2\times2}^{-1} = \begin{bmatrix} -2 & 1 & 1 & 1 \\ 1 & -2 & 1 & 1 \\ 1 & 1 & -2 & 1 \\ 1 & 1 & 1 & -2 \end{bmatrix} \quad (17)$$

If p=4, the sub-apertures images are combined in a "hierarchical" manner:

$$M_{4\times4} = \begin{bmatrix} M_{2\times2} & 0 & 0 & 0 \\ 0 & M_{2\times2} & 0 & 0 \\ 0 & 0 & M_{2\times2} & 0 \\ 0 & 0 & 0 & M_{2\times2} \end{bmatrix} M_{4\times4}^{-1} = \quad (18)$$

$$\begin{bmatrix} M_{2\times2}^{-1} & 0 & 0 & 0 \\ 0 & M_{2\times2}^{-1} & 0 & 0 \\ 0 & 0 & M_{2\times2}^{-1} & 0 \\ 0 & 0 & 0 & M_{2\times2}^{-1} \end{bmatrix}$$

In another embodiment of the disclosure, some metadata are associated with the matrix M.

Indeed, as the matrix M may be chosen at the encoder side, in one embodiment of the disclosure, it is needed to transmit information related to such matrix (or the inverse of such matrix) into the encoded bitstream for enabling the decoder to recover the sub-aperture image views. For example, a metadata structure can describe the $p^2$ coefficients of the matrix M. Such structure can be typically transmitted within High level syntax groups of elements, such as the Video Parameter Set (VPS), which contains the parameters for all the views. In a variant, metadata related to the matrix M (or the inverse matrix of the matrix M) may be stored in a memory unit of the decoder (or in the memory unit of a device connected to the decoder), and the metadata can be read when necessary during a decoding process.

In order to benchmark the proposed technique, the Multi-View HEVC (MV-HEVC) encoder has been used. In addition, a plenoptic image is computed using the synthetic image renderer PBRT (http://www.pbrt.org/) which has been extended to simulated plenoptic cameras. The extended version of PBRT is able to simulate real lenses taking into consideration any optical aberrations (color aberration as well). The simulation context is defined by the following features:

Optical System:

The main-lens simulated is a real lens as described in the document U.S. Pat. No. 8,373,933. It is a 25 mm focal opened at a F-number of 1.46. The lens is made of 11 glass elements. The elements are described by 2 interfaces which are either spherical or aspherical for 2 of them. The geometrical description of the interfaces are given in the following table. The terms A, B, C, D and E give the polynomial terms of respectively order 2, 4, 6, 8 and 10 for aspheric interfaces 18 and 19.

Sensor:

The sensor is made of 6000×4000 pixels for a size of 24 mm×16 mm, the pixel size is $\delta$=4 µm. The micro-lenses are covering almost 2×2 pixels: the micro-lens diameter is equal to $\phi$=7.99931340 µm. These values have been computed such that micro-lens image diameter is equal to strictly p=2 pixels. $\phi$ has been deduced using equation (7) considering d=12 µm the distance between the sensor and the micro-lens array, and D=139.8079 mm the exit pupil of the main-lens (given by the optical software Zemax). The micro-lens array is defined by f=d=12 µm to have a type 1 plenoptic sensor. The f-number of the micro-lenses o=f/$\phi$ is equal to 1.5 as the f-number of the main-lens.

Figure 18:
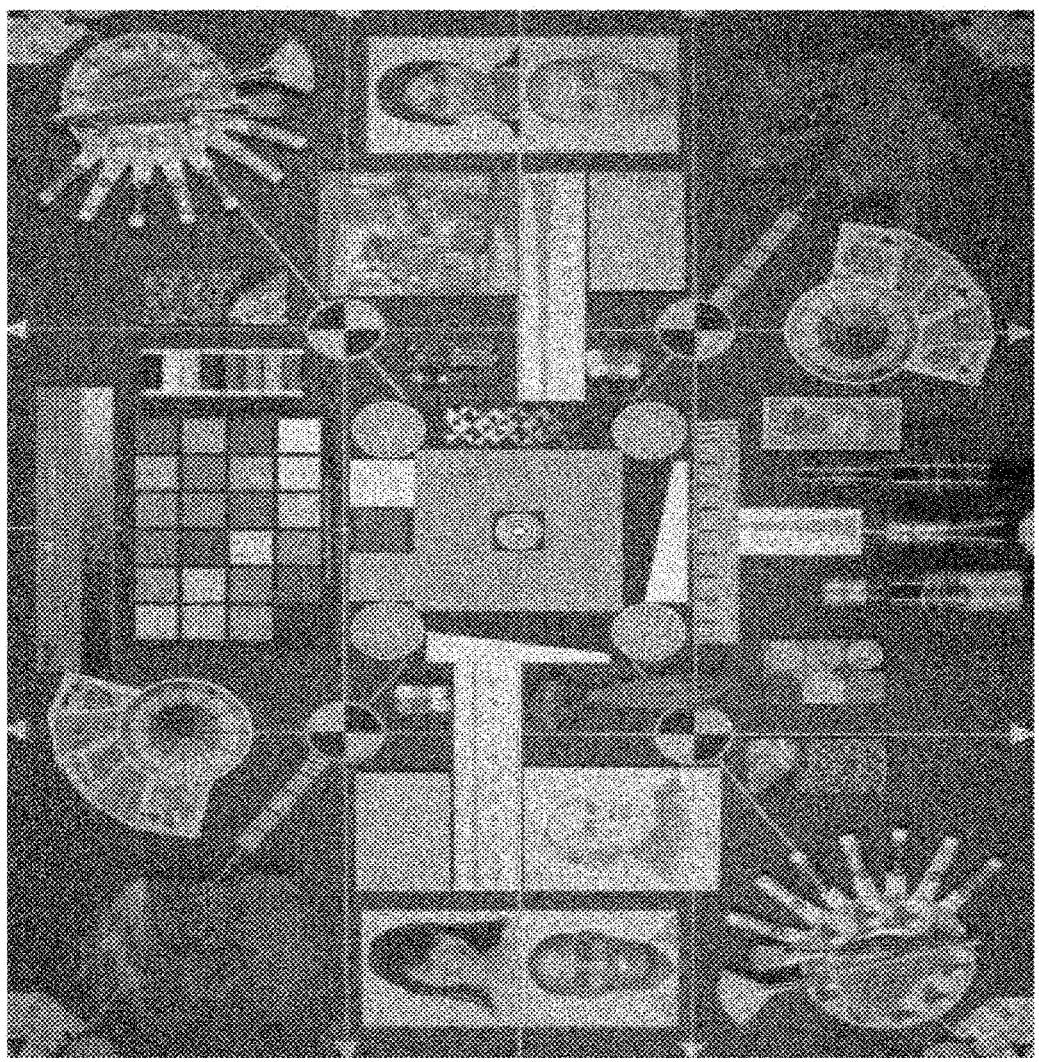
FIG. 18 presents an example of a test-chart image used for the testing or benchmarking of the present technique.

Test-Chart:

a test chart image of very high resolution taken from a Pentax camera (8000×5000 pixels) is used and positioned at 1.6 m from the simulated camera (see for example the test chart image of FIG. 18).

The plenoptic image is computed and then converted into 2×2 sub-aperture images. The MV-HEVC codec is used in two different manners:

1. Reference coding—The first sub-aperture image is used as reference to the MV-HEVC codec. The three other sub-aperture images are encoded into 3 other views. A total of 4 views are encoded.
2. Tested Optimized coding—The 4 sub-aperture images are averaged into a single image which is encoded as the reference image. Then the 4 sub-aperture images are encoded into 4 additional views. A total of 5 views are encoded, where only 4 would be sufficient to rebuild the 4 sub-aperture images.

The Common Test Conditions by MPEG, defining the configuration input files, were used. In particular, the tested quantization parameters (QPs) range from 22 to 37.

Figure 19:
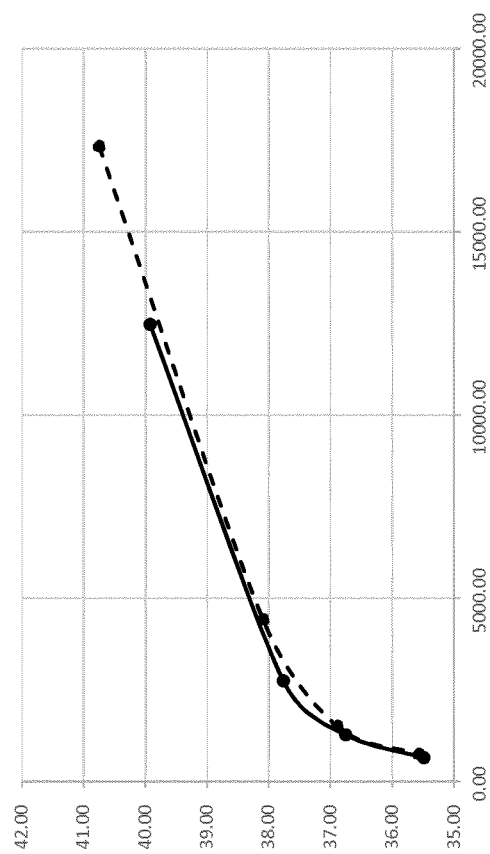
FIG. 19 presents a graph that depicts the PSNR (in dB) as a function of the bitrate for the reference coding (dashed or dotted curve) and the optimized coding (plain curve)

As shown in FIG. 19, despite the redundancy of the optimized coding (five views encoded instead of four), the compression tradeoff on bit-rate/distortion is better than the reference coding on a large range of bitrate.

Figures 20, 21:
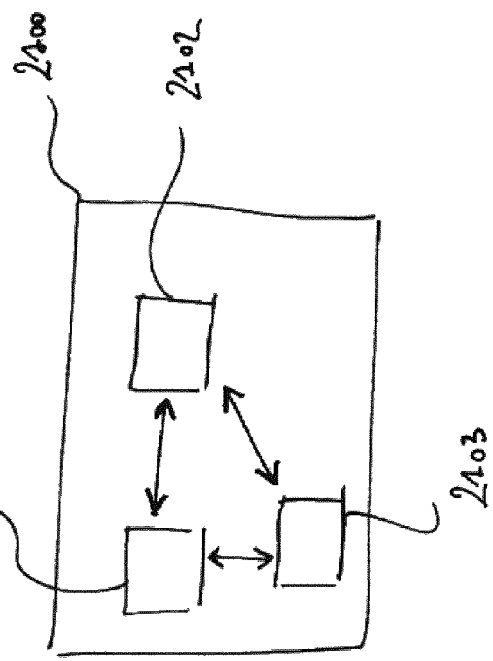
FIG. 20 presents detailed results from the testing used with configuration and test chart from respectively FIG. 17 and FIG. 18.
FIG. 21 presents in a schematic drawing an example of a device that can be used to perform one or several steps of methods disclosed in the present document.

FIG. 20 details the results of the experiment/test. The "tested" part stands for the "tested optimized" method. The top part shows the Bjontegaard bitrade/distortion score considering the total bitrate and the PSNR of each sub-aperture, whereas the bottom part shows the average PSNR of the 4 sub-apertures.

Indeed, the top part details the PSNR for each sub-aperture. The PSNR of the base-view in MV-HEVC is not reported in the case of the tested method since it does not correspond to an output sub-aperture. It can be noticed that the sub-aperture 00 has a higher PSNR for the reference setup. This is due to the MV-HEVC basic configuration that tends to increase the quality of the base view which will be used as reference for the other frames (The base view is encoded with a lower Quantization Parameter). In the optimized case, the average picture is encoded at a higher quality. The optimized methods thus allow an average gain of 12.54% on this image, providing also interesting features:

The base view, which corresponds to the average picture, can be decoded with an HEVC decoder, which is a feature of MV-HEVC. A device that is not compatible with sub-aperture, or does not need this feature, could then just decode the average image. This feature can be considered as a sub-aperture scalability;

The sub-apertures get a similar quality, which allows the next processing stages to rely on similar content.

FIG. 21 presents a device that can be used to perform one or several steps of methods disclosed in the present document.

Such device referenced 2100 comprises a computing unit (for example a CPU, for "Central Processing Unit"), referenced 2101, and one or more memory units (for example a RAM (for "Random Access Memory") block in which intermediate results can be stored temporarily during the execution of instructions a computer program, or a ROM block in which, among other things, computer programs are stored, or an EEPROM ("Electrically-Erasable Programmable Read-Only Memory") block, or a flash block) referenced 2102. Computer programs are made of instructions that can be executed by the computing unit. Such device 2100 can also comprise a dedicated unit, referenced 2103, constituting an input-output interface to allow the device 2100 to communicate with other devices. In particular, this dedicated unit 2103 can be connected with an antenna (in order to perform communication without contacts), or with serial ports (to carry communications "contact"). It should be noted that the arrows in FIG. 21 signify that the linked unit can exchange data through buses for example together.

In an alternative embodiment, some or all of the steps of the method previously described, can be implemented in hardware in a programmable FPGA ("Field Programmable Gate Array") component or ASIC ("Application-Specific Integrated Circuit") component.

In an alternative embodiment, some or all of the steps of the method previously described, can be executed on an electronic device comprising memory units and processing units as the one disclosed in the FIG. 21.

The invention claimed is:

1. A method for encoding a matrix of sub-aperture images obtained from data acquired by a plenoptic camera, wherein the method comprises:
    obtaining at least one reference image view from a combination of sub-aperture images from the matrix of sub-aperture images, wherein said obtaining comprises determining several reference image views by using an invertible mixing matrix for combining sub-aperture images from the matrix;
    replacing one of the sub-aperture images in the matrix of sub-aperture images by the at least one reference image view; and
    encoding sub-aperture images based on the several reference image views.

2. The method of claim 1, wherein the encoding is compliant with HEVC encoding techniques or H.264 encoding techniques.

3. The method of claim 1, wherein the method further comprises generating metadata comprising at least one of information data related to the combination or a position of the at least one reference image view in an encoded stream.

4. A method for decoding a matrix of encoded sub-aperture images obtained from data acquired by a plenoptic camera, the method comprising:
    decoding several reference image views based on metadata information;
    decoding the encoded sub-aperture images based on decoded several reference image views to provide a first matrix of sub-aperture images; and
    obtaining a second matrix of sub-aperture images based on the first matrix of sub-aperture images and metadata comprising information data related to a combination of sub-aperture images included in the first matrix of sub-aperture images, wherein the combination uses an invertible mixing matrix for combining sub-aperture images included in the first matrix.

5. The method of claim 4, wherein the method further comprises obtaining the metadata information and the metadata from a memory unit.

6. The method of claim 4, wherein the decoding is compliant with HEVC decoding techniques or H.264 decoding techniques.

7. An electronic device for encoding a matrix of sub-aperture images obtained from data acquired by a plenoptic camera, the electronic device comprising a processor and at least one memory unit coupled to the processor, wherein the processor is configured to:
    obtain at least one reference image view from a combination of sub-aperture images from the matrix of sub-aperture images, wherein the processor is further configured to determine several reference image views by using an invertible mixing matrix for combining image views from the matrix;
    replace one of the sub-aperture images in the matrix of sub-aperture images by the at least one reference image view; and
    encode sub-aperture images based on the several reference image views.

8. The electronic device of claim 7, wherein the processor is further configured to generate metadata comprising information data related to at least one of the combination or a position of the at least one reference image view in an encoded stream.

9. An electronic device for decoding a matrix of encoded sub-aperture images obtained from data acquired by a plenoptic camera, the electronic device comprising a processor and at least one memory unit coupled to the processor, the processor being configured to:
    decode several reference image views based on metadata information;
    decode the encoded sub-aperture images based on several decoded reference image views, delivering a first matrix of sub-aperture images; and
    obtain a second matrix of sub-aperture images as a function of the first matrix of sub-aperture images and metadata comprising information data related to a combination of sub-aperture images included in the first matrix of sub-aperture images, wherein the combination uses an invertible mixing matrix for combining sub-aperture images included in the first matrix.

10. The electronic device of claim 9, wherein the processor is further configured to obtain the metadata information and the metadata from a memory unit.

11. The electronic device of claim 9, wherein the processor is further configured to decode according to HEVC decoding techniques or H.264 decoding techniques.

12. A non-transitory computer-readable medium storing executable program instructions to cause a computer executing the instructions to perform a method according to claim 1.

13. A non-transitory computer-readable medium storing executable program instructions to cause a computer executing the instructions to perform a method according to claim 4.

14. The electronic device of claim 7, wherein the processor is further configured to encode according to HEVC encoding techniques or H.264 encoding techniques.

15. The method of claim 1, wherein the combination corresponds to an averaging of all the sub-aperture images comprised in the matrix.

16. The method of claim 1, wherein the combination corresponds to an averaging of the at least two of the sub-aperture images comprised in the matrix, and the at least two of the sub-aperture images included in the averaging are contiguous.

17. The electronic device of claim 7, wherein the combination corresponds to an averaging of all the image views comprised in the matrix.

18. The electronic device of claim 7, wherein the combination corresponds to an averaging of the at least two of the sub-aperture images comprised in the matrix, and the at least two of the sub-aperture images included in the averaging are contiguous.

* * * * *